(12) United States Patent
Aurand et al.

(10) Patent No.: US 12,060,061 B2
(45) Date of Patent: Aug. 13, 2024

(54) METHOD FOR OPERATING A VEHICLE AND DEVICE FOR CARRYING OUT THE METHOD

(71) Applicant: Daimler Truck AG, Leinfelden-Echterdingen (DE)

(72) Inventors: Tobias Aurand, Ludwigsburg (DE); Markus Zimmer, Leinfelden-Echterdingen (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 266 days.

(21) Appl. No.: 17/781,670

(22) PCT Filed: Oct. 12, 2020

(86) PCT No.: PCT/EP2020/078592
§ 371 (c)(1),
(2) Date: Jun. 1, 2022

(87) PCT Pub. No.: WO2021/110304
PCT Pub. Date: Jun. 10, 2021

(65) Prior Publication Data
US 2023/0001924 A1 Jan. 5, 2023

(30) Foreign Application Priority Data
Dec. 2, 2019 (DE) ............. 10 2019 008 368.7

(51) Int. Cl.
*B60W 30/12* (2020.01)
*B60W 30/09* (2012.01)
(Continued)

(52) U.S. Cl.
CPC ............ *B60W 30/12* (2013.01); *B60W 30/09* (2013.01); *B60W 40/08* (2013.01); *G01C 21/30* (2013.01);
(Continued)

(58) Field of Classification Search
CPC ...... B60W 30/12; B60W 30/09; B60W 40/08; B60W 2552/53; B60W 2540/26; G01C 21/30
See application file for complete search history.

(56) References Cited

U.S. PATENT DOCUMENTS

| 5,922,036 A | 7/1999 | Yasui et al. |
| 6,560,531 B1 | 5/2003 | Joshi |

(Continued)

FOREIGN PATENT DOCUMENTS

| DE | 697 34 477 T2 | 7/2006 |
| DE | 10 2009 028 813 A1 | 2/2011 |

(Continued)

OTHER PUBLICATIONS

PCT/EP2020/078592, International Search Report dated Jan. 20, 2021 (Two (2) pages).

*Primary Examiner* — Jacob M Amick
(74) *Attorney, Agent, or Firm* — Crowell & Moring LLP (57) ABSTRACT

A method for operating a vehicle includes carrying out a lane-keeping control of the vehicle along a course of a lane travelled in by the vehicle. When lane markings are detected, the course of the lane is determined on a basis of detected lane markings. When lane markings are not detected, the course of the lane is determined in a mapped-based manner on a basis of data from a digital map where a rough localization of the vehicle in the digital map and a fine localization of the vehicle in the digital map is performed.

9 Claims, 10 Drawing Sheets

(51) Int. Cl.
*B60W 40/08* (2012.01)
*G01C 21/30* (2006.01)

(52) U.S. Cl.
CPC ..... *B60W 2540/26* (2013.01); *B60W 2552/53* (2020.02)

(56) References Cited

U.S. PATENT DOCUMENTS

2010/0295668 A1* 11/2010 Kataoka ............... B62D 15/029
 701/533
2016/0272203 A1* 9/2016 Otake ............. B60W 30/18145

FOREIGN PATENT DOCUMENTS

| DE | 10 2010 007 240 A1 | 8/2011 |
| DE | 10 2015 015 097 A1 | 5/2016 |
| DE | 10 2015 209 467 A1 | 11/2016 |
| DE | 10 2017 216 238 A1 | 3/2019 |
| DE | 10 2017 011 808 A1 | 6/2019 |

* cited by examiner

METHOD FOR OPERATING A VEHICLE AND DEVICE FOR CARRYING OUT THE METHOD

BACKGROUND AND SUMMARY OF THE INVENTION

The invention relates to a method for operating a vehicle and to a device for carrying out the method.

As described in EP 2 049 521 B1, a driver assistance system and a method for assisting the driver of a vehicle in keeping to a lane in which the vehicle is currently travelling are known from the prior art. In the method, the current lane is detected and a movement lane of a guide vehicle driving ahead of the vehicle is determined as an object lane. The assistance can be provided as a purely lane-related assistance mode based on the detected current lane, or as a purely object-related assistance mode based on the determined object lane, or as a blended assistance mode based on both the detected current lane and the detected object lane. The assistance is offered over the entire speed range through which the vehicle can travel. Depending on the vehicle's current driving speed, one of the assistance modes is set as a lateral guidance operating mode, according to which the assistance is to be provided.

DE 10 2010 007 240 A1 describes a method for determining the course of a lane of a connecting route between a first vehicle and a second vehicle. The first vehicle travels ahead of the second vehicle and has lane course detection means for establishing the course of a lane travelled by the former. For the first vehicle, the lane course of a route travelled by it is determined and transmitted to the second vehicle. The lane course of the connecting travel distance between the two vehicles is determined by establishing a position of the second vehicle on the transmitted lane course.

A method for operating a vehicle is known from DE 10 2015 015 097 A1. In this method, a warning message is issued to a driver of the vehicle if a hands-free situation is detected after a predetermined period of time has elapsed. The warning message comprises a request to place at least one hand of the driver on a steering wheel of the vehicle. If the hands-free situation remains after a further predefined period of time has elapsed following the warning message issued, an emergency stop assistant is activated. An actual speed of the vehicle is reduced with a delay in at least two deceleration steps when the emergency stop assistant is activated, until the vehicle is at a standstill or the emergency stop assistant is deactivated. If the actual speed of the vehicle falls below a predefined threshold when the emergency stop assistant is activated, a hazard warning flashing device is activated.

The invention is based on the object of specifying a method, which is improved compared to the prior art, for operating a vehicle and of specifying a device for carrying out the method.

In a method according to the invention for operating a vehicle, a lane-keeping control of the vehicle is implemented along the course of a lane travelled by the vehicle. If lane markings are detected, the lane course is determined on the basis of the detected lane markings and, if lane markings are not detected, it is determined in a map-based manner using data from a digital map, the vehicle being localized in the digital map for the map-based determination of the lane course. Here, a 'non-detection' means both complete non-detection and partial non-detection. For this purpose, a rough position of the vehicle in the digital map is determined for a rough localization of the vehicle in the digital map. The determination is carried out here using a conventional localization system, in particular by means of a global navigation satellite system (for example Global Positioning System) and/or by triangulation of mobile radio masts transmitting radio signals. Based on the determined rough position, the lane, in particular a portion of the lane in a surrounding region of the determined rough position, is identified in the digital map. For a fine localization of the vehicle in the digital map, a course of the lane, in particular of the identified portion of the lane, is compared with a recorded course of a portion of the path travelled by the vehicle. The comparison of the course of the lane, in particular of the identified portion of the lane, with the recorded course of the portion of the path travelled by the vehicle is carried out in particular by cross-correlating the course of the lane, in particular of the identified portion of the lane, with the recorded course of the portion of the path travelled by the vehicle. Thus, for this comparison, the course of the lane, in particular of the identified portion of the lane, is advantageously cross-correlated with the recorded course of the portion of the path travelled by the vehicle. The vehicle is located at the point where the cross-correlation results in a maximum match between the identified portion of the lane and the recorded course of the portion of the path travelled by the vehicle.

The method according to the invention enables lane-keeping control of the vehicle along the course of the lane travelled by the vehicle even if the lane markings are not detected, thus then being carried out in a map-based manner, i.e., on the basis of the data of the digital map. This is made possible by not only using the rough localization of the vehicle in the digital map, which is too imprecise to implement the lane-keeping control, but also by carrying out a fine localization in addition to and in particular based on this rough localization. This fine localization of the vehicle in the digital map advantageously determines a current fine position of the vehicle in the digital map, in particular within the lane, in particular within the identified portion of the lane. As a result, the position of the vehicle can be determined exactly, whereby a portion of the course of the lane ahead of the vehicle, along which lane-keeping control is carried out, can be determined exactly from the digital map, so that lane-keeping control can be carried out with high precision.

This is of great important particularly in the case of a curve in the lane, since the vehicle must then be guided exactly along the course of the curve, i.e., the curved course of the lane, by means of the lane-keeping control, for which purpose it may be necessary in particular to change a steering angle of the vehicle, because if a current steering angle were to be maintained, the vehicle at the exit of a curve would leave the lane in the direction of an edge of the lane on the inside of the curve, and if the vehicle were steered straight ahead, it would leave the lane in the direction of an edge of the lane on the outside of the curve.

A curve of the lane is therefore advantageously identified as a portion of the lane. The method, in particular the lane-keeping control of the vehicle or at least the map-based determination of the course of the lane on the basis of the data of the digital map or at least the localization of the vehicle in the digital map or at least the fine localization of the vehicle in the digital map, is therefore carried out by means of this method in particular along a curved course of the lane travelled by the vehicle, i.e., in a portion of the lane formed as a curve, for example exclusively along such a curved course of the lane travelled by the vehicle. i.e., exclusively in a portion of the lane formed as a curve.

The course of the lane is then determined in a map-based manner using the data of the digital map in particular if the lane markings are not present or at least one of the lane markings is not clearly detected, i.e., in particular if there is a non-detection of the lane markings.

The method is used, i.e., carried out, in particular during an emergency stop maneuver, i.e., to carry out the emergency stop maneuver, in which the vehicle is braked to a standstill under lane-keeping control, for example, if a driver of the vehicle is unfit to drive. This enables the vehicle to be stopped safely without endangering vehicle occupants and/or other road users.

The driver's inability to drive is determined in particular by a determination of a lack of responsiveness of the driver to a request for action issued to the driver. Such a request for action is in particular a so-called hands-off warning, i.e., a request to take hold again of a steering wheel of the vehicle, or a request to take over the driving of the vehicle, in particular in the case of automated, in particular highly automated, driving. The failure of the driver to respond to a request to take action that has been issued can serve as sufficient indication that the driver is unfit to drive.

In the described method, in particular for lane-keeping control of the vehicle according to the course of the lane travelled by the vehicle, the lane course is thus determined on the basis of the detected lane markings when the lane markings are detected and is determined in a map-based manner on the basis of the data of the digital map when the lane markings are not detected, in particular if the lane markings are partially or completely not present or cannot be detected unambiguously. For the map-based determination of the course of the lane, the localization of the vehicle in the digital map is required. For this purpose, the rough localization of the vehicle is carried out by means of the global navigation satellite system (GNSS), for example, and the portion of the lane in the vicinity of the roughly localized vehicle position, i.e., the rough position of the vehicle, is advantageously identified in the digital map. This portion of the lane is advantageously determined as the target lane. For the fine localization, the course of the target lane determined in this way is compared, i.e., matched, with the recorded course of the portion of the path travelled by the vehicle. The comparison is advantageously carried out by cross-correlating the course of the target lane with the recorded course of the portion of the path travelled by the vehicle.

A device according to the invention for carrying out the method comprises a control unit, configured to control at least one steering device of the vehicle for lane-keeping control of the vehicle along the course of the lane to be travelled by the vehicle, advantageously in addition to controlling a drive train and/or a braking device of the vehicle, at least one detection unit, configured to detect the lane markings, the digital map, a reception unit, configured to receive signals of the localization system, for example of the global navigation satellite system or of the system based on triangulation of radio signals, in particular mobile radio signals, a sensor system configured to detect the course of the portion of the path travelled by the vehicle, in particular by detecting waypoints passed, and a memory unit configured to record the detected course of the portion of the path travelled by the vehicle, and at least one processing unit configured to determine a course of the lane when the lane markings are detected on the basis of the detected lane markings and, on the basis of the map, on the basis of the data of the digital map when the lane markings are not detected. The vehicle can be localized in the digital map by means of the processing unit for the map-based determination of the course of the lane in that, for the rough localization of the vehicle, in the digital map the rough position of the vehicle in the digital map can be determined by means of the localization system, the lane, in particular the portion of the lane in the vicinity of the determined rough position, can be identified in the digital map on the basis of the determined rough position, the course of the lane, in particular the identified portion of the lane, can be identified in the digital map for the fine localization of the vehicle in the digital map, the course of the lane, in particular of the identified portion of the lane, can be compared with the recorded course of the portion of the path travelled by the vehicle, the comparison of the course of the lane, in particular of the identified portion of the lane, with the recorded course of the portion of the path travelled by the vehicle being able to be carried out by cross-correlating the course of the lane, in particular the identified portion of the lane, with the recorded course of the portion of the path travelled by the vehicle.

This results in the advantages already described for the method.

In one possible embodiment, the device is configured to carry out the method during the emergency stop maneuver, in which the vehicle can be braked to a standstill under lane-keeping control while the driver of the vehicle is unfit to drive. This results in the advantages already described above.

The device advantageously comprises at least one determination unit which is configured to determine the failure of the vehicle driver to respond to the request for action issued to the vehicle driver and thereby to determine the inability of the vehicle driver to drive. However, it is also conceivable to determine the inability to drive by observing the driver by means of a camera or by determining the inoperation of a dead man's switch to be actuated continuously.

Exemplary embodiments of the invention are explained in more detail below with reference to drawings.

DETAILED DESCRIPTION OF THE DRAWINGS

Corresponding parts are provided with like reference signs in all figures.

With reference to FIGS. 1 to 13, a method for operating a vehicle 1 and a device 4 for carrying out this method are described below. In this method, lane-keeping control of the vehicle 1 is carried out along a course of a lane FS travelled by the vehicle 1. The course of the lane is determined on the basis of the detected lane markings if lane markings are detected and is determined in a map-based manner on the basis of data of a digital map 2 if lane markings are not detected, in particular if the lane markings are not present or are not clearly detected, the vehicle 1 being localized in the digital map 2 for the map-based determination of the course of the lane.

For this purpose, for a rough localization of the vehicle 1 in the digital map 2, a rough position of the vehicle 1 in the digital map 2 is determined by means of a global navigation satellite system. Based on the determined rough position, the lane FS, in particular a portion A of the lane FS in a surrounding region of the determined rough position, is identified in the digital map 2.

For a fine localization of the vehicle 1 in the digital map 2, a course of the lane FS, in particular of the identified portion A of the lane FS, is compared with a recorded course of a path portion WA travelled by the vehicle 1. The comparison of the course of the lane FS, in particular of the identified portion A of the lane FS, with the recorded course of the path portion WA travelled by the vehicle 1 is carried out in particular by cross-correlating the course of the lane FS, in particular of the identified portion A of the lane FS, with the recorded course of the path portion WA travelled by the vehicle 1 and by processing the result. This fine localization of the vehicle 1 in the digital map 2 advantageously determines a current fine position of the vehicle 1 in the digital map 2, in particular within the lane FS, in particular within the identified portion A of the lane FS.

A curve K of the lane FS is advantageously identified as portion A of the lane FS. The method, in particular the lane-keeping control of the vehicle 1 or at least the map-based determination of the lane course on the basis of the data of the digital map 2 or at least the localization of the vehicle 1 in the digital map 2 or at least the fine localization of the vehicle 1 in the digital map 2, is therefore carried out by means of this method in particular along a curved course of the lane FS travelled by the vehicle 1, i.e., in a portion A of the lane FS formed as a curve K, for example exclusively along such a curved course of the lane FS travelled by the vehicle 1, i.e., exclusively in a portion A of the lane FS formed as a curve K.

The method is used, i.e., carried out, in particular during an emergency stop maneuver, i.e., for carrying out the emergency stop maneuver in which the vehicle 1 is braked to a standstill under lane-keeping control if a driver of the vehicle 1 is unfit to drive.

The vehicle driver's inability to drive is determined in particular by determining a failure of the driver to respond to a request to act issued to the driver. Such a request for action is in particular a so-called hands-off warning, i.e., a request to take hold again of a steering wheel of the vehicle 1, or a request to take over the driving of the vehicle, in particular in the case of automated, in particular highly automated, driving.

The method is in particular a steering assistance method. Advantageously, the method controls the vehicle 1 in a constantly automated manner within the lane FS. The mode of operation of previously known steering assistance methods is based primarily on data generated by detection units 3, in particular image-capturing devices, for example cameras. By means of this data, the lane markings can be recognised and captured. The steering assistance system can use this information to automatically control the vehicle 1 within the lane FS.

While such a previously known steering assistance system is active, the vehicle driver must monitor it and be ready to intervene at any time. This is called highly automated driving (level 2). To ensure the vehicle driver's constant presence, they must permanently touch the steering wheel or may only let go of it temporarily for short periods. Gripping the steering wheel can be detected by means of a manual torque applied to the steering wheel by the vehicle driver or by means of a capacitive sensor. If the lane markings are no longer detected correctly or if the lane markings have to be travelled over due to external circumstances, the driver must be able to intervene at any time.

Within emergency situations, in which the vehicle driver is, for example, unconscious or no longer capable of acting and is therefore no longer able to drive, manual intervention by the vehicle driver can no longer be ensured. Advantageously, the vehicle 1 should then come to a safe standstill. During the braking process, the vehicle 1 should continue to be kept as calmly as possible within the lane FS so as not to endanger the vehicle driver and other road users. In particular, this behavior should also be provided if the detection units 3, in particular the image-based systems, for lane detection, i.e., for detecting the lane markings, fail or do not provide reliable data. Within such an emergency situation, however, there is no possibility to fall back on the vehicle driver, nor do previously known steering assistance procedures offer a reliable and viable solution to continue to follow the course of the lane. Although sufficient data can be provided by means of highly accurate environment maps, these methods are expensive and susceptible to changes in the environment.

This problem is solved with the method described here. This solution makes it possible to extend a steering assistance method, which for example in normal operation only operates at an automation level according to level 2, within emergency situations to a quasi fully automated assistance method, similar to automation level 4. The vehicle 1 can thus maintain the lane, in particular within a curve K, without the driver and without image-based methods, i.e., without recognition of lane markings, and thus reduces the risk of an accident or the severity of an accident during the braking process.

The problem, which is solved with the procedure described here, consists in particular in the fact that although a current steering angle can be maintained in a straight lane FS, within curves K additional corrections must be made, which are subject to the problems already described by previous methods.

Figure 1:
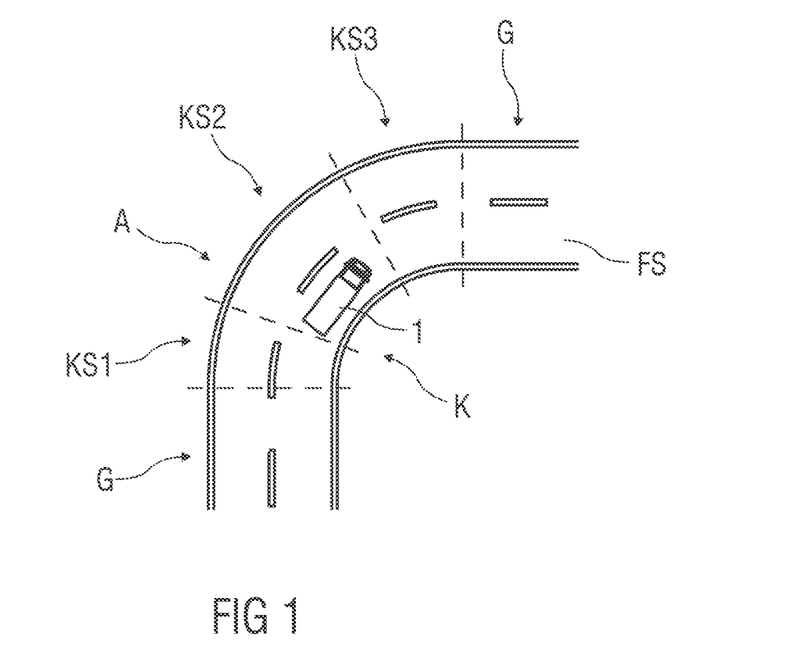
FIG. 1 shows schematically a structure of a curve.

The structure of a curve K is shown in FIG. 1. All curves K comprise three curve segments KS1, KS2, KS3. The first curve segment KS1 is an entry clothoid with a positive curvature. The second curve segment KS2 has a constant curvature. The third curve segment KS3 is an exit clothoid with a negative curvature. Before the curve K, i.e., before the first curve segment KS1, there is a straight line G in the example shown, and a straight line G is also connected to curve K, i.e., to the third curve segment KS3, in the example shown.

In previously known methods, either a steering torque can be reduced to zero or a current steering angle can be maintained. While these methods are sufficient for a straight lane FS, they cannot be used to navigate a curve K. The behavior is shown in FIGS. 2 and 3.

Figure 2:
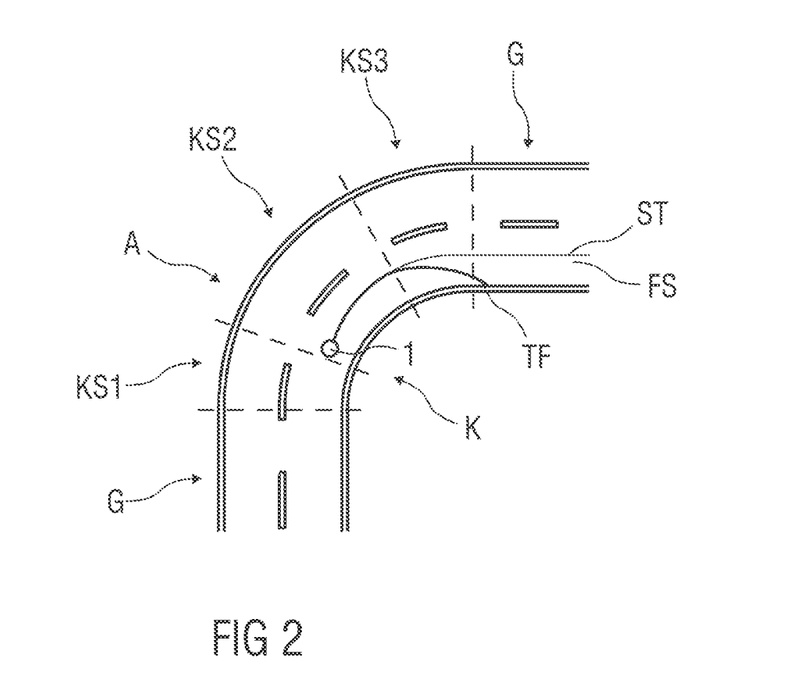
FIG. 2 shows schematically the navigation of a curve with a constant steering angle.

FIG. 2 shows the behavior of the vehicle 1 at a constant steering angle. A target trajectory ST is shown, which the vehicle 1 should actually follow in order to properly navigate the curve K, and an actual driving course TF of the vehicle 1. Within the second curve segment KS2, i.e., within the constant curvature of the curve K, the vehicle 1 follows the intended target trajectory ST. However, as soon as the vehicle 1 enters the exit clothoid, i.e., the third curve segment KS3, a transverse acceleration occurs due to the changing curvature of the curve K, and the vehicle 1 leaves the course of the lane FS. This leads to a road accident.

Figure 3:
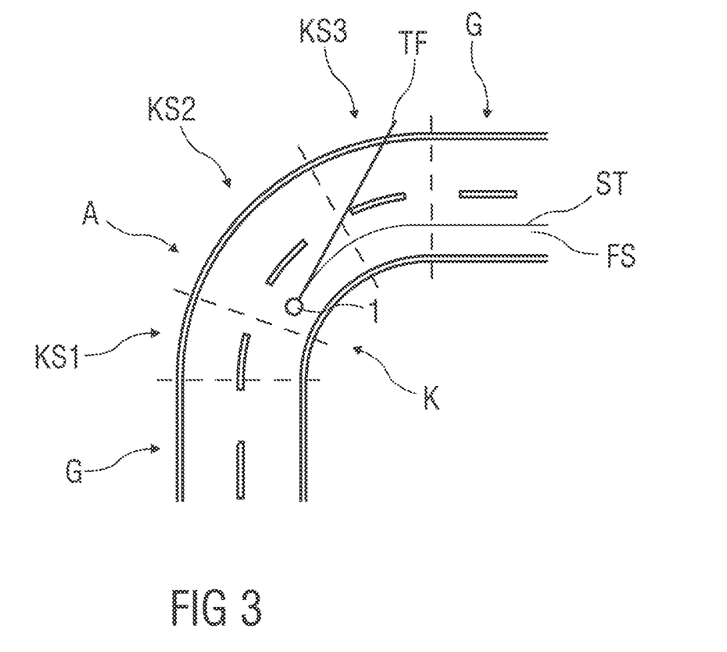
FIG. 3 shows schematically the navigation of a curve with a reduction of a steering torque to zero.

FIG. 3 shows the behavior of the vehicle 1 when the steering torque is set to zero within curves K. The vehicle 1 then immediately leaves the course of the lane FS and poses a high risk to all road users.

Figure 4:
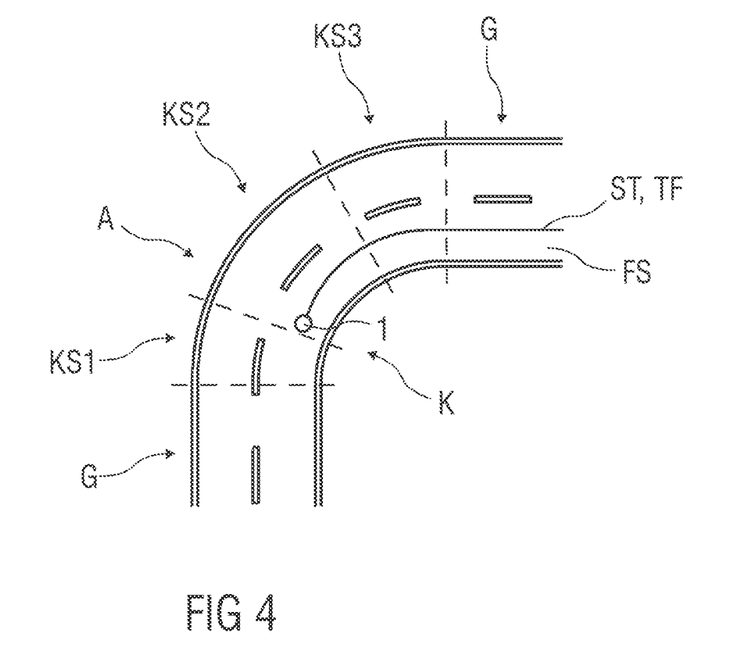
FIG. 4 shows schematically the navigation of a curve along an intended target trajectory.

As can be clearly seen from FIGS. 2 and 3, no predefined behavior can be used to keep the vehicle 1 safely in the lane FS within curves K. Therefore, the solution described here is necessary to be able to safely navigate curves K, also in emergency situations, as shown in FIG. 4. Here, the intended trajectory ST for navigating the curve K within the lane FS and the actual trajectory TF of the vehicle 1 coincide.

A position resolution of the global navigation satellite system is not sufficient to accurately determine the position of the vehicle 1 within curves K. However, it can be used to identify the current curve K within the digital map 2. In other words, as already described above, for the rough localization of the vehicle 1 in the digital map 2, the rough position of the vehicle 1 in the digital map 2 is determined by means of the global navigation satellite system and, on the basis of the determined rough position, the lane FS, in particular the portion A of the lane FS in the vicinity of the determined rough position, in particular the curve K of the lane FS in the vicinity of the determined rough position, is identified in the digital map 2. Using this high-resolution digital map 2 and the knowledge of which curve K is involved, required curve parameters can be established in order to determine an expected course of curvature KV within this curve K and thus the course of the lane FS. This is shown by way of example in FIG. 5. A curve K of the lane FS and the course of curvature KV of the curve K in relation to a path s through the curve K are shown.

Figure 5:
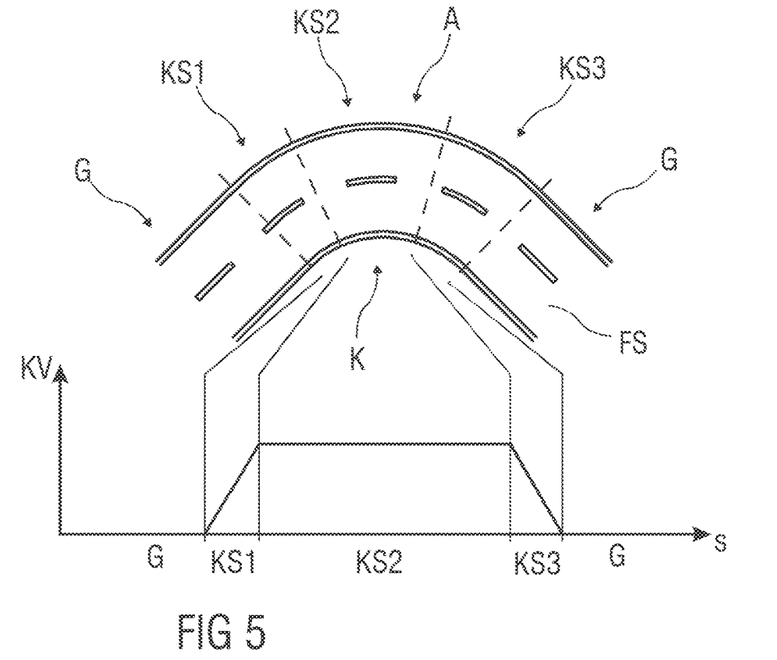
FIG. 5 shows schematically a curve and the course of curvature of the curve.

Once the curve K has been identified within the digital map 2 in the manner described, the curve segment KS1, KS2, KS3 of the curve K in which the vehicle 1 is currently located must be determined. For this purpose, the vehicle 1 must store the course of curvature KV already travelled through and compare it with the expected course of curvature KV of the curve K. In other words, as already described, a fine localization of the vehicle 1 is carried out in the digital map 2, for which purpose the course of the lane FS, in particular of the identified portion A of the lane FS, and thus the course of curvature KV of the curve K of the lane FS, is compared with the recorded course of the path portion WA travelled by the vehicle 1.

For this purpose, comparison methods such as cross-correlation, also called autocorrelation, between the expected course of curvature KV and the course of curvature KV already travelled through can be used. In other words, the comparison of the course of the lane FS, in particular of the identified portion A of the lane FS, with the recorded course of the path portion WA travelled by the vehicle 1 is, as already mentioned above, advantageously carried out by cross-correlating the course of the lane FS, in particular of the identified portion A of the lane FS, with the recorded course of the path portion WA travelled by the vehicle 1. Thus, for this comparison, the course of the lane FS, in particular of the identified portion A of the lane FS, is advantageously cross-correlated with the recorded course of the path portion WA travelled by the vehicle 1. In the example shown here, in which the portion A of the lane FS is a curve K and thus has a course of curvature KV, the expected course of curvature KV is thus cross-correlated with the recorded course of curvature KV already travelled.

Figure 6:
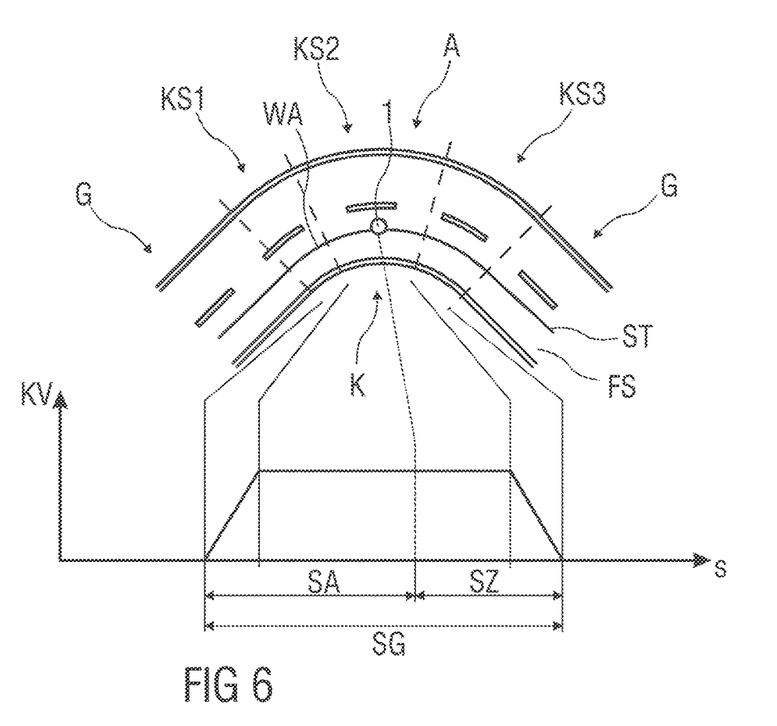
FIG. 6 shows schematically a curve, the course of curvature of the curve, and a vehicle in the curve along the course of curvature.

By observing the course of curvature KV, the start of the current curve segment KS1, KS2, KS3, i.e., the curve segment KS1, KS2, KS3 in which the vehicle 1 is located, can also be determined. The exact position of the vehicle 1 within the curve K, i.e., the fine position of the vehicle 1, can be determined on the basis of the distance WA travelled by the vehicle 1 within this curve segment KS1, KS2, KS3, which can be determined from correspondingly recorded data of the vehicle 1. The vehicle 1 can now continue to follow the course of the lane FS according to the intended target trajectory ST in order to remain in the curve K within the lane FS. The course-of-curvature diagram in FIG. 6 shows an entire route SG along the course of curvature KV, which is divided into a route portion SA that has already been travelled and a route portion SZ along the course of curvature KV that is yet to be travelled.

With reference to FIGS. 7 to 12, a sequence of the method is described below for navigation of the curve K shown here. In each of the FIGS. 7 to 12, the lower course-of-curvature diagram shows the course of curvature KV of this curve K, which was determined from this digital map 2 in the manner described above after the rough localization of the vehicle 1 by means of the global navigation satellite system. In each of FIGS. 7 to 12, the upper course-of-curvature diagram shows a part of the route SA of this course of curvature KV that has already been travelled.

Figure 7:
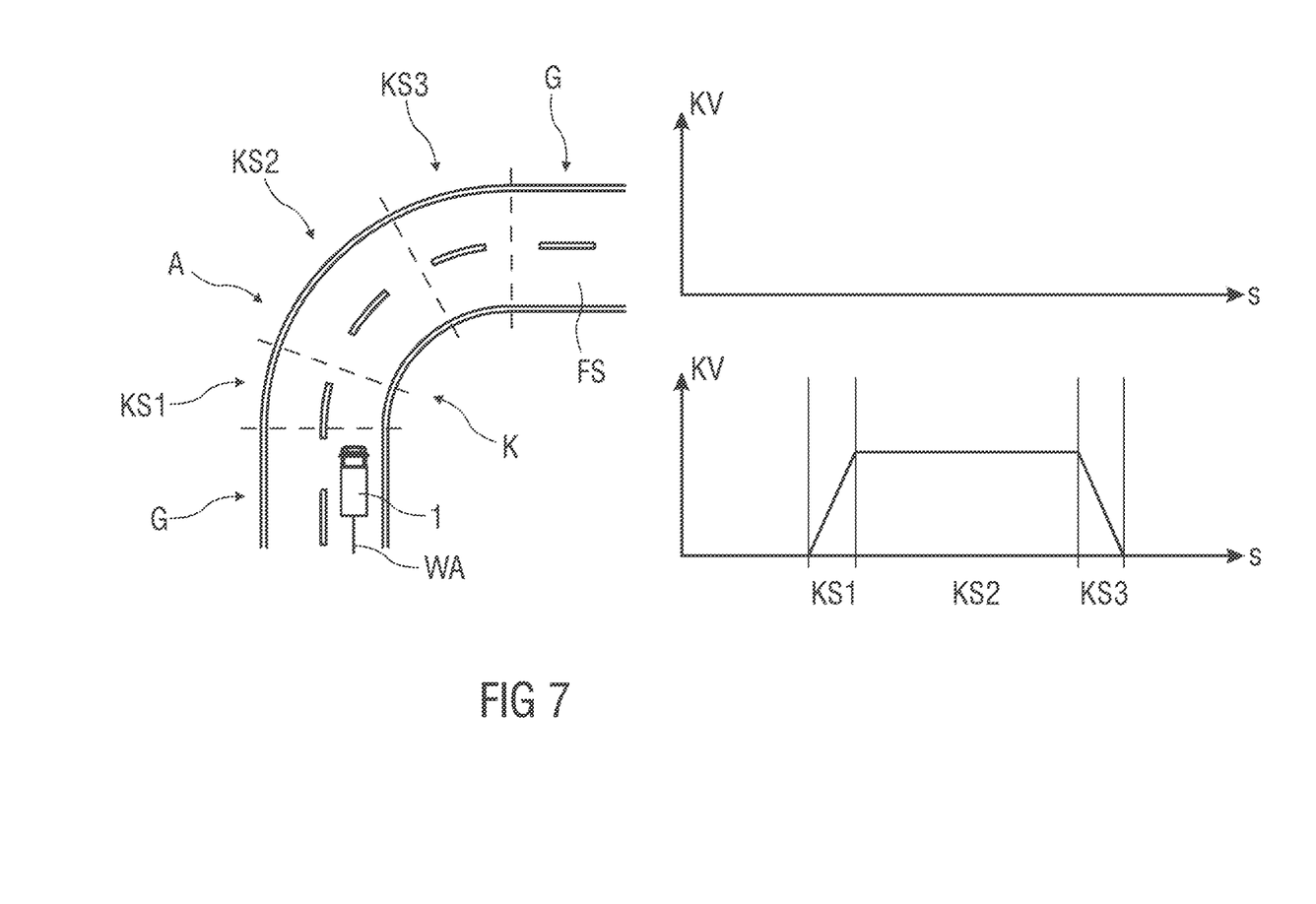
FIG. 7 shows schematically a beginning of a course of navigation of a curve.

In FIG. 7, the vehicle 1 is at a start of the navigation of the curve K. The driver of the vehicle 1 is still healthy here. Due to the start of the curve, the upper course-of-curvature diagram does not yet show a part of the route SA of the course of curvature KV that has already been travelled.

Figure 8:
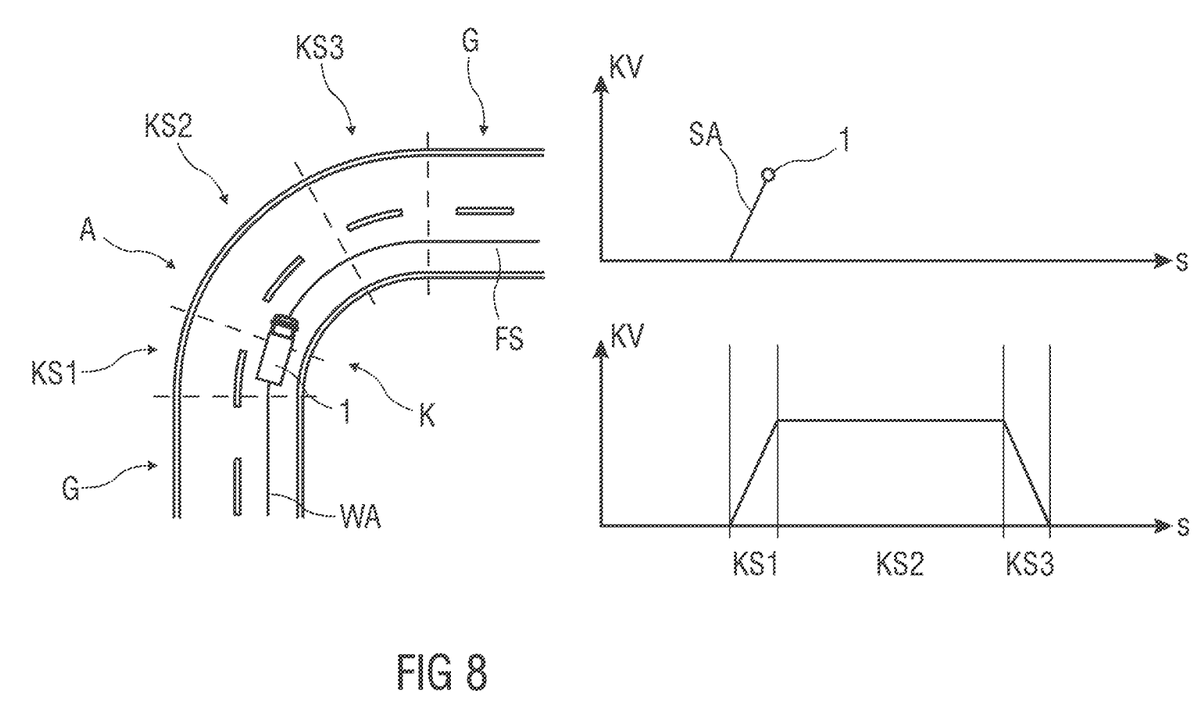
FIG. 8 shows schematically a further course of the navigation of the curve.

In FIG. 8, the vehicle 1 enters curve K with the driver still in good health. The part of the route SA of the course of curvature KV that has already been travelled is shown in the upper course-of-curvature diagram. This corresponds to the recorded course of the path portion WA in the curve K already travelled by the vehicle 1.

Figure 9:
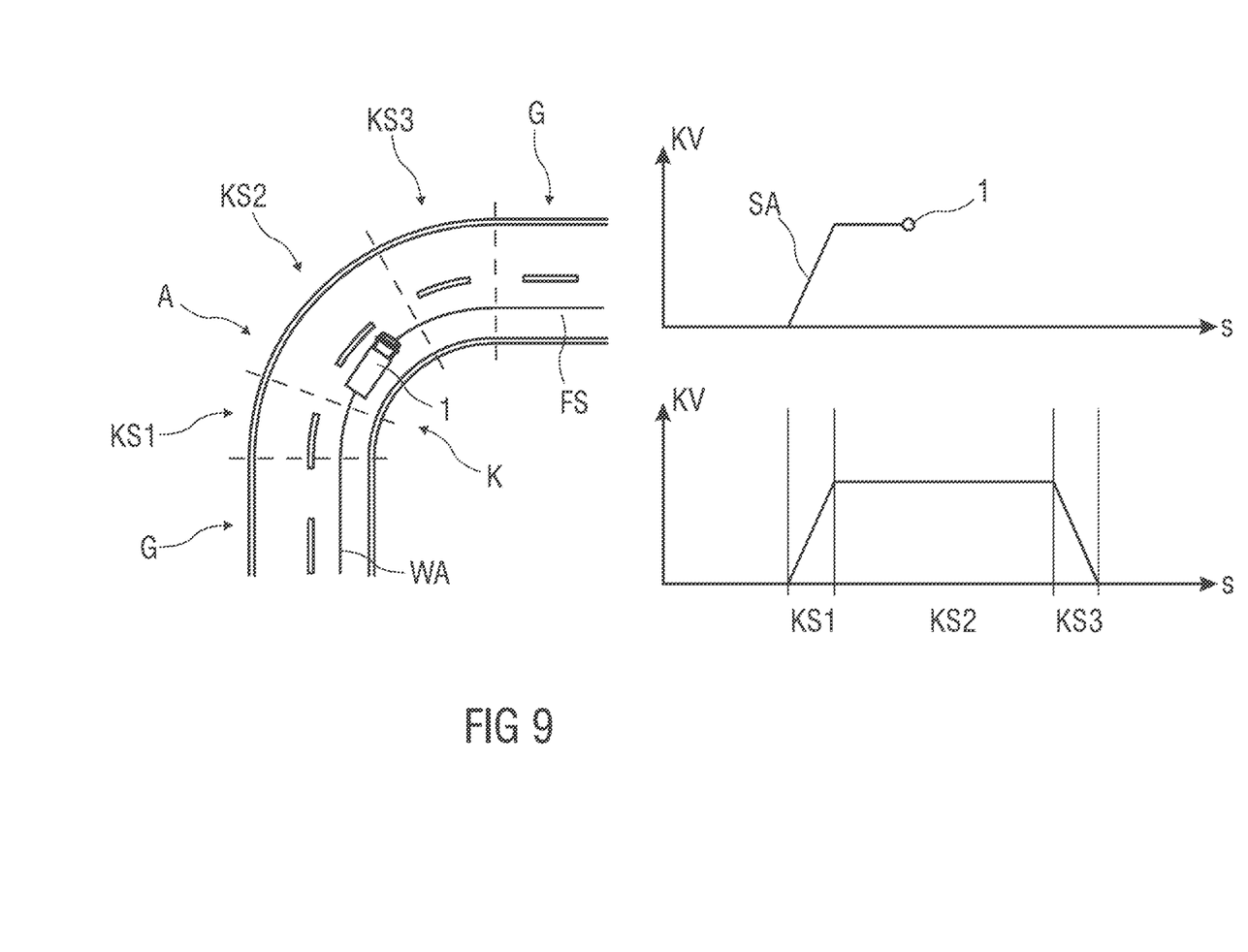
FIG. 9 shows schematically a further course of the navigation of the curve.

In FIG. 9, the vehicle 1 has moved further into the curve K. The part of the route SA of the course of curvature KV that has already been travelled is shown in the upper course-of-curvature diagram. This corresponds to the recorded course of the path portion WA already travelled by the vehicle 1 in the curve K. It is not possible to reliably detect lane markings by means of the detection unit 3 or a plurality of detection units 3, in particular by means of cameras, and therefore it is not possible to determine the course of the lane on the basis of the lane markings. In this situation, the course of curvature KV travelled, i.e., the part of the route SA of the course of curvature KV already travelled, is cross-correlated with the course of curvature KV of this curve K determined from the digital map 2, i.e., compared by means of the cross-correlation, i.e., for the fine localization of the vehicle 1 in the digital map 2, the course of the lane FS, in particular of the identified portion A of the lane FS, is compared by means of the cross-correlation with the recorded course of the path portion WA travelled by the vehicle 1 in order to determine the curve segment KS1, KS2, KS3 in which the vehicle 1 is currently located, in this case the second curve segment KS2. Based on the angle already travelled within this curve segment KS2, the exact position, i.e., the fine position of the vehicle 1, within the curve K can be determined.

Figure 10:
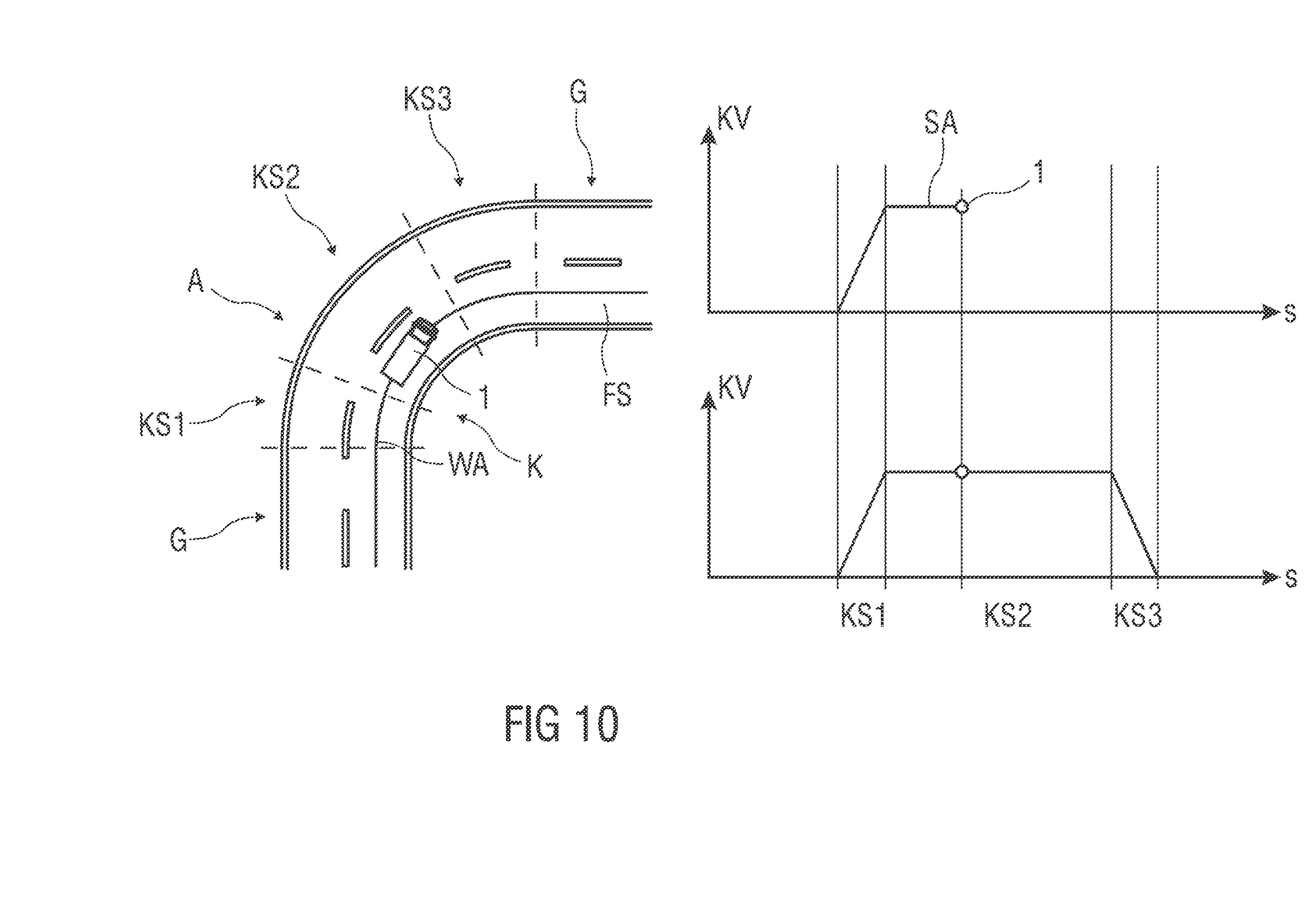
FIG. 10 shows schematically a further course of the navigation of the curve.
Figure 11:
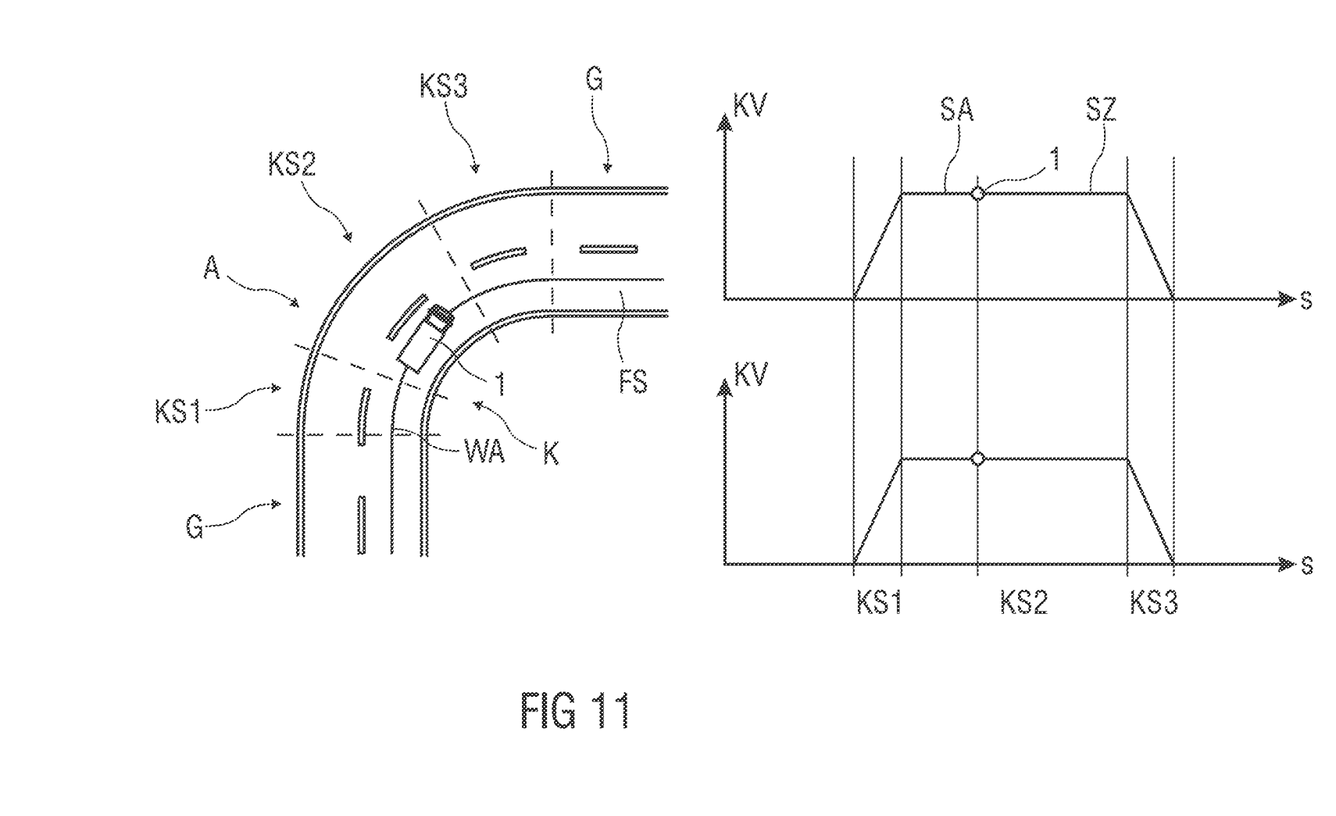
FIG. 11 shows schematically a further course of the navigation of the curve.

FIG. 10 shows the position of the vehicle 1 on the course of curvature KV of the curve K determined from the digital map 2 in the lower course-of-curvature diagram. On the basis of this course of curvature KV, the remaining part of the route SZ of the course of curvature KV yet to be driven in the curve K can now be determined, shown in FIG. 11 in the upper course-of-curvature diagram.

Figure 12:
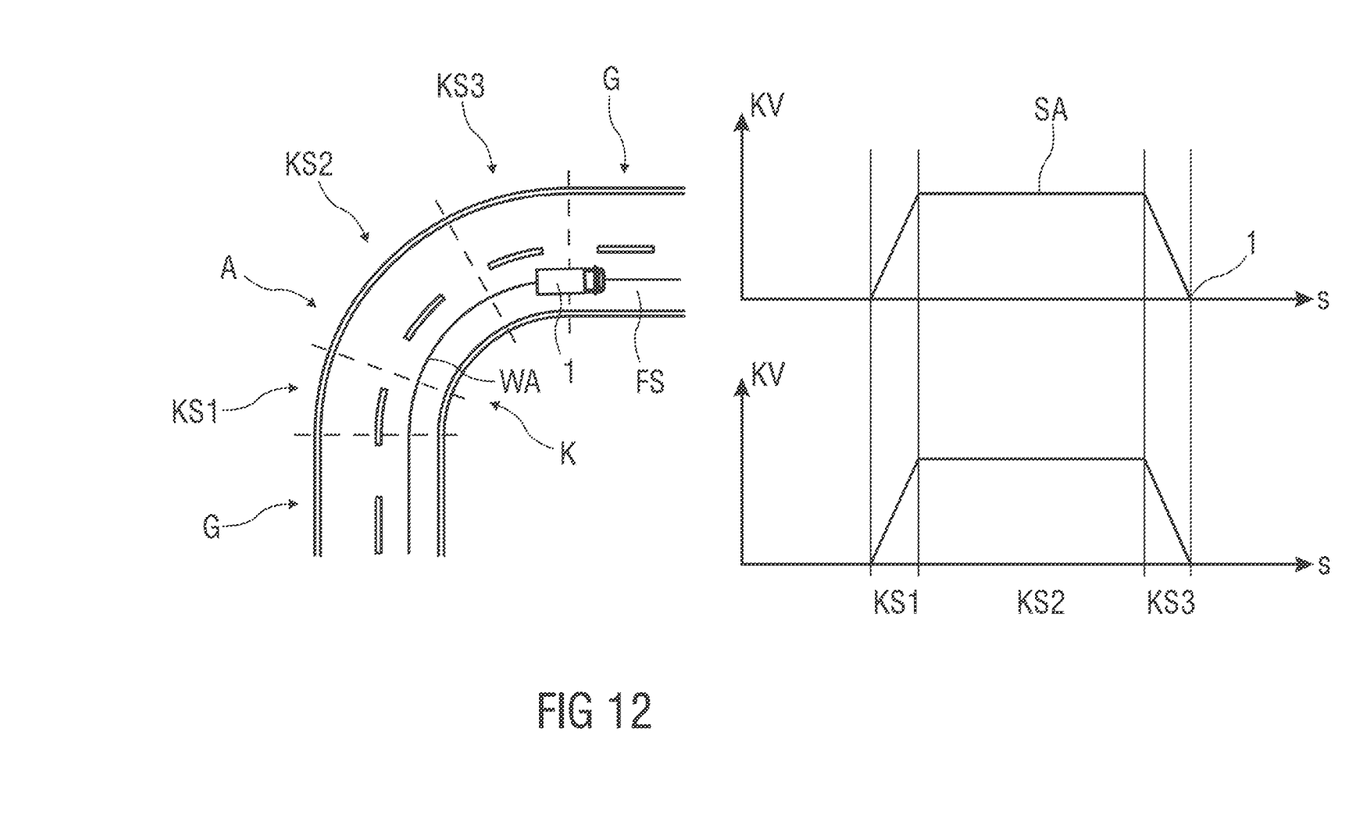
FIG. 12 shows schematically an end of the course of the navigation of the curve.

The vehicle 1 now continues to follow the course of curvature KV of the curve K in accordance with the determined part of the route SZ of the course of curvature KV yet to be driven and in this way successfully navigates the curve K, as shown in FIG. 12.

For the determination of the position within the curve K, the determination of the curve segment KS1, KS2, KS3 as well as the traversed distance, i.e., the already travelled part of the route SA and thus the recorded course of the path portion WA travelled by the vehicle 1, within the curve segment KS1, KS2, KS3 is advantageously used. The described procedure can therefore be implemented in particular for curves K. In the case of straight portions A of the lane FS, for example, inaccuracies that are too great could occur in the calculation of the distance travelled, i.e., the recorded course of the path portion WA travelled by the vehicle 1, over long periods of time. However, in the case of straight portions A of the lane FS, the rough localization by means of the global navigation satellite system can determine that the vehicle 1 is currently travelling on a straight portion A of the lane FS, so that, for example, a predefined behavior can then be used for this purpose, for example the steering torque can be set to zero.

To carry out the method, it is advisable that at least a small part of the curve K has already been driven through in order to be able to determine the current curve segment KS1, KS2, KS3 by comparing the distance travelled, i.e., the recorded course of the path segment WA travelled by the vehicle 1. Furthermore, this increases the probability that the at least one detection unit 3, for example the camera, recognises the lane markings again at the end of the curve K and the course of the lane can thus be determined again on the basis of the detected lane markings and a lane-keeping control of the vehicle 1 can be carried out on this basis.

Figure 13:
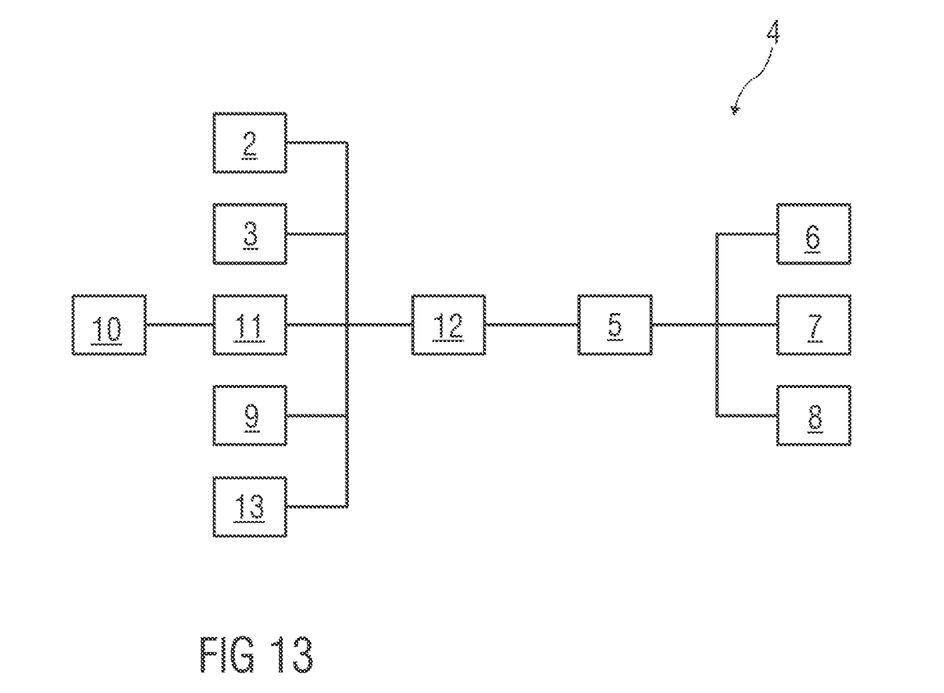
FIG. 13 shows schematically a device for carrying out a method for operating a vehicle, wherein lane-keeping control of the vehicle is carried out along a course of a lane travelled by the vehicle.

FIG. 13 shows a device 4 for carrying out the method. It comprises a control unit 5, configured to control at least one steering device 6 of the vehicle 1 for lane-keeping control of the vehicle 1 along the course of the lane FS travelled by the vehicle 1, advantageously in addition to controlling a drive train 7 and/or a braking device 8 of the vehicle 1, the at least one detection unit 3, configured to detect the lane markings, the digital map 2, a reception unit 9, configured to receive signals from the global navigation satellite system, a sensor system 10 and a memory unit 11, which are configured to detect and record the course of the path portion WA travelled by the vehicle 1, and at least one processing unit 12, configured to determine the course of the lane on the basis of the detected lane markings when the lane markings are detected and in a map-based manner on the basis of the data of the digital map 2 when the lane markings are not detected.

The vehicle 1 can be localized in the digital map 2 by means of the processing unit 12 for the map-based determination of the lane course in that, for the rough localization of the vehicle 1 in the digital map 2, the rough position of the vehicle 1 in the digital map 2 can be determined by means of the global navigation satellite system, the lane FS, in particular the portion A of the lane FS in the surrounding region of the determined rough position, can be identified in the digital map 2 on the basis of the determined rough position, for the fine localization of the vehicle 1 in the digital map 2, the course of the lane FS, in particular of the identified portion A of the lane FS, can be compared with the recorded course of the path portion WA travelled by the vehicle 1, wherein the comparison of the course of the lane FS, in particular of the identified portion A of the lane FS, with the recorded course of the path portion WA travelled by the vehicle 1 can be carried out by cross-correlating the course of the lane FS, in particular of the identified portion A of the lane FS, with the recorded course of the path portion WA travelled by the vehicle 1.

Advantageously, the device 4 is configured to carry out the method during the emergency stop maneuver, in which the vehicle 1 can be braked to a standstill under lane-keeping control while the driver of the vehicle 1 is unfit to drive.

Advantageously, the device 4 additionally comprises at least one determination unit 13, which is configured to determine the failure of the vehicle driver to respond to the request for action issued to the vehicle driver, and thereby to determine that the vehicle driver is unfit to drive.

The invention claimed is:

1. A method for operating a vehicle (1), comprising the steps of:
   carrying out a lane-keeping control of the vehicle (1) along a course of a lane (FS) travelled in by the vehicle (1);
   wherein when lane markings are detected, determining the course of the lane (FS) on a basis of detected lane markings;
   wherein when lane markings are not detected:
      determining the course of the lane (FS) in a mapped-based manner on a basis of data from a digital map (2), wherein the vehicle (1) is localized in the digital map (2) and wherein:
         for a rough localization of the vehicle (1) in the digital map (2), determining a rough position of the vehicle in the digital map by a localization system and identifying a portion (A) of the lane (FS) in a surrounding region of the determined rough position in the digital map (2) on a basis of the determined rough position; and
         for a fine localization of the vehicle (1) in the digital map (2), a course of the identified portion (A) of the lane (FS) is compared with a recorded course of a path portion (WA) travelled by the vehicle (1), wherein the comparison of the course of the identified portion (A) of the lane (FS) with the recorded course of the path portion (WA) travelled by the vehicle (1) is performed by cross-correlating the course of the identified portion (A) of the lane (FS) with the recorded course of the path portion (WA) travelled by the vehicle (1).

2. The method according to claim 1, wherein the fine localization of the vehicle (1) in the digital map (2) determines a current fine position of the vehicle (1) in the digital map (2) within the identified portion (A) of the lane (FS).

3. The method according to claim 1, wherein a curve (K) of the lane (FS) is identified as the portion (A) of the lane (FS).

4. The method according to claim 1, wherein the course of the lane is determined on the basis of the data from the digital map (2) when the lane markings are not present or are not clearly detected.

5. The method according to claim 1, wherein the method is performed during an emergency stopping maneuver in which the vehicle (1) is braked to a standstill under the lane-keeping control while a driver of the vehicle (1) is unfit to drive.

6. The method according to claim 5, wherein the unfit to drive is determined by detecting a failure of the driver to respond to a request for an action issued to the driver.

7. A device (4) for carrying out the method according to claim 1, comprising:
- a control unit (5) configured to control a steering device (6) of the vehicle (1) for the lane-keeping control of the vehicle (1) along the course of the lane (FS) travelled by the vehicle (1);
- a detection unit (3) configured to detect the lane markings;
- the digital map (2);
- a reception unit (9) configured to receive signals from a global navigation satellite system;
- a sensor system (10) and a memory unit (11) configured to detect and record the course of the path portion (WA) travelled by the vehicle (1); and
- a processing unit (12) configured to:
  - determine the course of the lane on the basis of the detected lane markings when the lane markings are detected; and
  - determine the course of the lane in the map-based manner on the basis of the data from the digital map (2) when the lane markings are not detected.

8. The device (4) according to claim 7, wherein the device is configured to carry out the method during an emergency stopping maneuver in which the vehicle (1) can be braked to a standstill under the lane-keeping control while a driver of the vehicle (1) is unfit to drive.

9. The device (4) according to claim 8, further comprising a determination unit (13) configured to determine a failure of the driver to respond to a request for an action issued to the driver.

* * * * *